US009740642B2

United States Patent
Peng et al.

(10) Patent No.: US 9,740,642 B2
(45) Date of Patent: Aug. 22, 2017

(54) METHODS AND ELECTRONIC DEVICES FOR ADJUSTING THE OPERATING FREQUENCY OF A MEMORY

(75) Inventors: Jingang Peng, Beijing (CN); Xiaogang Wang, Beijing (CN); Xiaoyi Feng, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 84 days.

(21) Appl. No.: 13/821,700

(22) PCT Filed: Sep. 5, 2011

(86) PCT No.: PCT/CN2011/079316
§ 371 (c)(1),
(2), (4) Date: Mar. 8, 2013

(87) PCT Pub. No.: WO2012/031540
PCT Pub. Date: Mar. 15, 2012

(65) Prior Publication Data
US 2013/0166832 A1   Jun. 27, 2013

(30) Foreign Application Priority Data
Sep. 10, 2010   (CN) .......................... 2010 1 0280793

(51) Int. Cl.
*G06F 12/00* (2006.01)
*G06F 13/16* (2006.01)
*G06F 3/06* (2006.01)

(52) U.S. Cl.
CPC .......... *G06F 13/1689* (2013.01); *G06F 3/061* (2013.01); *G06F 3/0604* (2013.01); *G06F 3/0629* (2013.01); *G06F 3/0679* (2013.01)

(58) Field of Classification Search
CPC ...... G06F 3/0653; G06F 3/061; G06F 1/3203; G06F 1/3202; G06F 1/324; G06F 1/3296;
(Continued)

(56) References Cited
U.S. PATENT DOCUMENTS 7,417,905 B2 *   8/2008  Cheng .......................... 365/191
7,430,676 B2     9/2008  Baker et al.
(Continued)

FOREIGN PATENT DOCUMENTS

| CN | 1352422 A | 6/2002 |
|---|---|---|
| CN | 1687867 A | 10/2005 |

(Continued)

OTHER PUBLICATIONS

Admin, Using the Windows Server 2008 Task Manager for Logging and Debugging, May 6, 2010, http://www.winserverhelp.com/2010/05/using-windows-server-2008-r2-task-manager-for-logging-and-debugging/, pp. 1 and 2.*
International Search Report dated Oct. 18, 2011 for corresponding International Application No. PCT/CN2011/079316, filed Sep. 5, 2011.
(Continued)

*Primary Examiner* — Reginald Bragdon
*Assistant Examiner* — Hannah A Faye-Joyner
(74) *Attorney, Agent, or Firm* — Westman, Champlin & Koehler, P.A.

(57) ABSTRACT

Methods and electronic devices for adjusting an operating frequency of a memory are disclosed. The method includes: transmitting to the memory a first command that instructs the memory to hold the data information in the memory; transmitting to the memory controller a second command that adjusts the first frequency of the memory controller to a second frequency; and transmitting to the memory a third command that instructs the memory to exchange the data information according to the second frequency of the memory controller. According to the disclosure, it is possible to dynamically adjust the frequency of the memory during (Continued)

operation, avoiding the need of the user to turn off and then turn on the electronic device to adjust the frequency of the memory.

7 Claims, 4 Drawing Sheets

(58) Field of Classification Search
CPC ... G06F 1/3275; G06F 9/5016; G06F 11/3466
USPC ................................................ 711/167, 103
See application file for complete search history.

(56) References Cited

U.S. PATENT DOCUMENTS

2009/0049314 A1* 2/2009 Taha et al. ..................... 713/300
2010/0045691 A1* 2/2010 Naito ....................... G09G 5/36
345/581

FOREIGN PATENT DOCUMENTS

| CN | 1936778 A | 3/2007 |
| CN | 1963772 A | 5/2007 |

OTHER PUBLICATIONS

Written Opinion of the International Searching Authority for corresponding International Application No. PCT/CN2011/079316, filed Sep. 5, 2011.

* cited by examiner

METHODS AND ELECTRONIC DEVICES FOR ADJUSTING THE OPERATING FREQUENCY OF A MEMORY

CROSS-REFERENCE TO RELATED APPLICATION

This application is a Section 371 National Stage Application of International Application No. PCT/CN2011/079316, filed 5 Sep. 2011 and published as WO 2012/031540 A1 on 15 Mar. 2012, in Chinese, the contents of which are hereby incorporated by reference in their entirety.

TECHNICAL FIELD

Embodiments of the present invention relate to terminal operation, and more particularly, to methods and electronic devices for adjusting an operating frequency of a memory.

BACKGROUND

Conventionally, when a user intends to adjust an operating frequency of a memory of an electronic device such as a laptop computer, a desktop computer, or a mobile phone, the user has to turn off the electronic device, and then restart it to enter a setup interface. Then the user can adjust and save the frequency of the memory. Subsequently, the electronic device should be restart again to cause the memory operating at a new frequency.

During researching, the inventor found that the conventional approach has following defects:

1. Restart of the electronic device is required for adjusting the frequency of the memory, the adjustment is not achievable when the electronic device is in operating status, and the process of adjustment is tediously long;

2. The adjustment is implemented by the user manually and thus is not convenient or intelligent;

3. The adjustment is complex so that it is only suitable for professionals (for example, a professional maintainer of the device) rather than common users.

SUMMARY

Embodiments of the present invention provide methods and electronic devices for adjusting an operating frequency of a memory, capable of dynamically adjusting the operating frequency of the memory during operation, avoiding the need of the user to turn off and then turn on the electronic device to adjust the frequency of the memory.

Embodiments of the present invention are implemented as following.

A method for adjusting an operating frequency of a memory, wherein the method is applied to an electronic device including a memory controller and a memory connected with the memory controller, and the memory operates at a first frequency of the memory controller when the electronic device is in an operating status, said method includes:

transmitting to the memory a first command that instructs the memory to hold the data information in the memory;

transmitting to the memory controller a second command that adjusts the first frequency of the memory controller to a second frequency; and transmitting to the memory a third command that instructs the memory to exchange the data information according to the second frequency of the memory controller.

Preferably, the first command further instructs the memory to enter a self refresh mode in order to hold the data information in the memory.

Preferably, the first command further instructs the memory to write the data information into a flash memory; and the third command further instructs the memory to read the data information from the flash memory and exchange the data information according to the second frequency of the memory controller.

Preferably, the method further includes, before transmitting the first command to the memory:

receiving an instruction for adjusting the frequency of the memory, wherein the instruction for adjusting the frequency of the memory is generated when the operating frequency of the central processor is adjusted from the third frequency to a fourth frequency, or generated according to a usage of system resource.

An electronic device, including:

a memory controller;

a memory connected to the memory controller, wherein the memory operates according to a first frequency of the memory controller when the electronic device is in an operating status; and a frequency controller connected to the memory controller and the memory, adapted to transmit to the memory a first command that instructs the memory to hold the data information in the memory, transmit to the memory controller a second command that adjusts the first frequency of the memory controller to a second frequency, and transmit to the memory a third command that instructs the memory to exchange the data information according to the second frequency of the memory controller.

Preferably, the first command further instructs the memory to enter a self refresh mode in order to hold the data information in the memory.

Preferably, the first command further instructs the memory to write the data information into a flash memory; and wherein the third command further instructs the memory to read the data information from the flash memory and exchange the data information according to the second frequency of the memory controller.

Preferably, the electronic device further includes a receiving unit adapted to receive an instruction for adjusting the frequency of the memory, wherein the instruction for adjusting the frequency of the memory is generated when the operating frequency of the central processor is adjusted from the third frequency to a fourth frequency, or generated according to a usage of system resource.

A method for adjusting an operating frequency of a memory, wherein the method is applied to an electronic device including a central processor having a third frequency, a memory controller having a first frequency, and a memory exchanging data information with the central processor according to the first frequency of the memory controller, said method includes:

monitoring a usage rate of system resource;

adjusting the operating frequency of the memory controller according to the usage of system resource such that the operating frequency of the memory controller is adjusted from the first frequency to a second frequency.

A method for adjusting an operating frequency of a memory, wherein the method is applied to an electronic device including a central processor having a third frequency, a memory controller having a first frequency, and a memory exchanging data information with the central processor according to the first frequency of the memory controller, said method includes:

monitoring the operation frequency of the central processor;

generating an instruction for adjusting the frequency of the memory when the operating frequency of the central processor is adjusted from the third frequency to a fourth frequency; and adjusting the operating frequency of the memory controller from the first frequency to a second frequency according to the instruction for adjusting the frequency of the memory.

Preferably, adjusting the operating frequency of the memory controller from the first frequency to a second frequency includes:

transmitting to the memory a first command that instructs the memory to hold the data information in the memory;

transmitting to the memory controller a second command that adjusts the first frequency of the memory controller to a second frequency; and transmitting to the memory a third command that instructs the memory to exchange the data information according to the second frequency of the memory controller.

In contrast to the conventional approach, embodiments of the present invention automatically adjust the frequency of the memory when the electronic device is in an operating status. The adjusting does not need the user to participate, for example, does not need a setting of adjusting the frequency of the memory by user. When the electronic device is in an operating status, the data information exchanged by the memory with the central processor according to the first frequency of the memory controller can be held during the automatic adjusting of the frequency of the memory, ensuring that after the memory controller is adjusted from the first frequency to the second frequency, the previously held data information can be continually exchanged with the central processor. Accordingly, regular use of the electronic device by the user would not be affected.

The conventional approach of adjusting the frequency of the memory by the user manually has blindness to some extent (i.e. the frequency of the memory is adjusted by the user blindly to maximum, such that the memory could not be utilized efficiently and the system resource is wasted). In contrast, according to the embodiments, the frequency of the memory can be adjusted dynamically according to the usage of system resource or the operating frequency of CPU, such that the memory may be utilized efficiently, the performance of the electronic device is improved, and the waste of the system resource is reduced.

In the conventional electronic device, when the usage of system resource is changed, the frequency of the central processor, rather than the frequency of the memory, can be adjusted dynamically, such that the bandwidth resource of the memory and the power consumption are wasted. In another case, after the frequency of the memory is adjusted dynamically, the memory can operate at only a specific frequency, such that the performance of the electronic device is degraded. According to the embodiments of the present invention, when the usage of system resource is changed, both the frequency of the central processor and the frequency of the memory may be adjusted dynamically, such that the usage of the bandwidth resource of the memory is increased and the power consumption is reduced. According to another aspect of the embodiments, the adjustment of the frequency of the memory may be varied according to the adjustment of the frequency of the central processor, such that the frequency of the central processor is matched with the frequency of the memory, well utilizing the central processor and the bandwidth of the memory and improving the performance of the electronic device.

BRIEF DESCRIPTION OF THE DRAWINGS

In order to illustrating the embodiments of the present invention or conventional solutions in more detail, drawings for describing the embodiments or conventional solutions will be introduced briefly as follows. It is apparent that the following drawings are only examples of the present invention. Based on these drawings, it is possible for those skilled in the art to obtain other drawings without inventive effort.

DETAILED DESCRIPTION OF THE PREFERRED EMBODIMENTS

In the following, the embodiments of the present invention will be described in further detail with reference to the figures. It is apparent that the described embodiments are some, but not all, of the examples of the present invention. Any other embodiment obtained by those skilled in the art from these embodiments of the present invention without inventive effort falls within the scope of the present invention.

Figure 1:
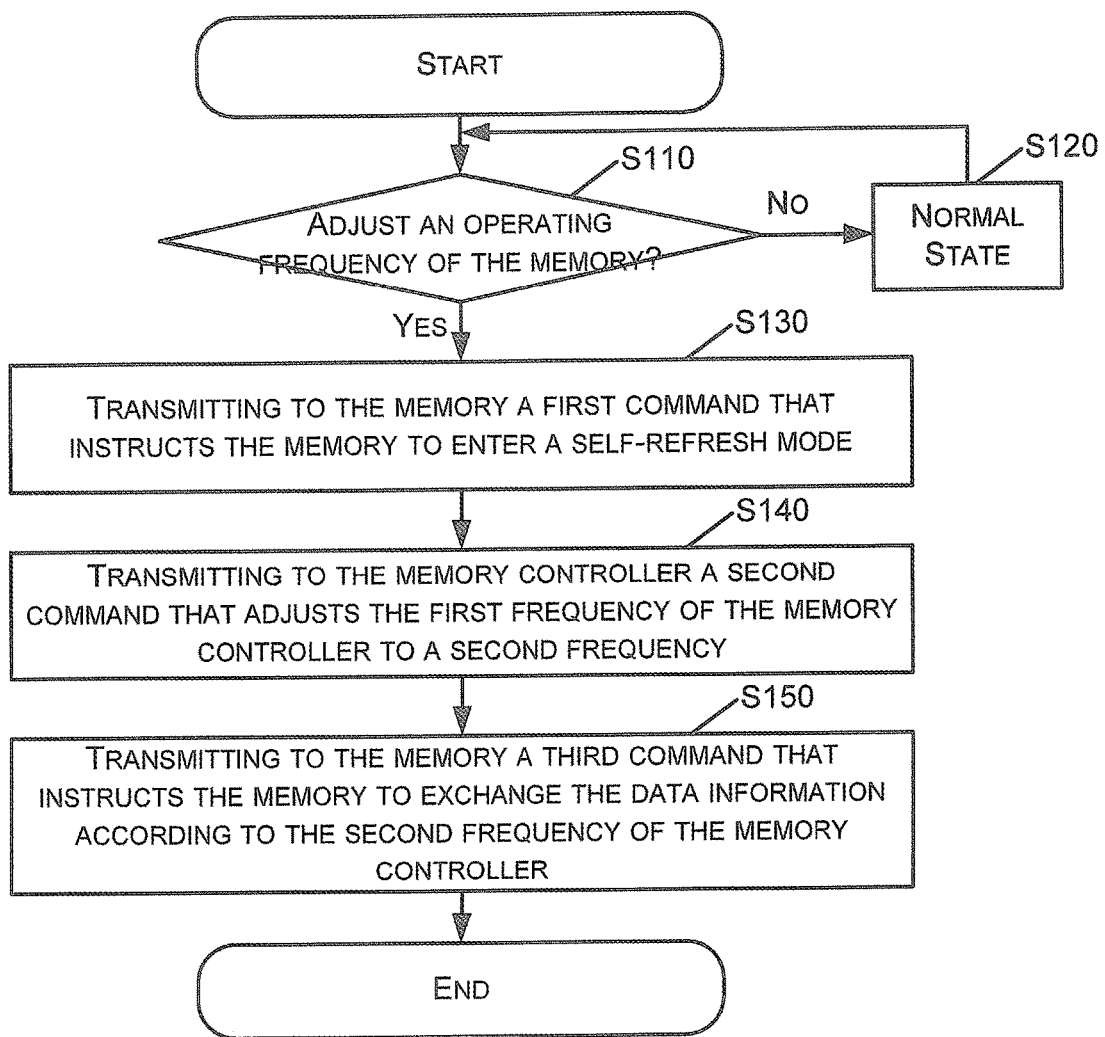
FIG. 1 is a flowchart schematically illustrating a method for adjusting the operating frequency of a memory according to an embodiment of the present invention.

With reference to FIG. 1, a flowchart schematically illustrating a method for adjusting the operating frequency of a memory according to an embodiment of the present invention is shown. The method according to the embodiment of the present invention is applied in an electronic device including a memory controller and a memory connected with the memory controller, wherein the memory operates according to a first frequency of the memory controller when the electronic device is in an operating status. Conventionally, the first frequency is not changeable when the electronic device is in operating status.

For the purpose of illustrating the embodiments of the present invention, a computer is taken as an example of the electronic device in the following. Those skilled will recognize that in addition to the computer, the present disclosure is applicable to other electronic devices such as a mobile phone, PDA (Personal Digital Assistant) and the like.

The method for adjusting an operating frequency of the memory includes the following steps.

At step 110, determining whether to adjust the operating frequency of the memory.

Determination of whether to adjust the operating frequency of the memory of the computer may be made according to the usage of system resource. The usage of system resource may include a usage of CPU (Central Processing Unit), a usage of memory, a usage of network bandwidth, etc. Any one of, or a combination of any two or three of, the usages of CPU, memory, and network bandwidth etc. may be taken as a measure of the usage of system resource. For example, a usage of system resource in the computer lower than a threshold (such as a usage of CPU lower than 10%, a usage of the memory lower than 20%, . . . ) indicates that there is a waste of the system resource. The operating frequency of the memory should be decreased when the usage of system resource in the computer is lower than a threshold, and increased when the usage of system resource in the computer is higher than a threshold, in order to meet the various user requirements. The present invention is not limited to determine whether to adjust the operating frequency of the memory of the computer according to the usage of system resource, and the determination may be made according to any other parameter such as a parameter set by the user.

If it is determined to adjust the operating frequency of the memory, the process proceeds to step S130, otherwise, the process proceeds to step S120.

At step S120, no setting is required to be applied to the computer, and the computer operates normally (i.e. the memory exchanges the data information with the central processor at the first frequency), and the process proceeds to step S110.

At step S130, a first command configured to instruct the memory to enter a self refresh mode is transmitted to the memory.

Particularly, the first command is configured to instruct the memory to enter a self refresh mode in order to keep the data information in the memory.

The memory enters the self refresh mode by a self refresh command (REFS-EN). After the memory enters the self refresh mode, the data information in the memory may be kept from being lost.

At step S140, a second command configured to adjust the first frequency of the memory controller to a second frequency is transmitted to the memory controller.

In practice, in order to adjust the output frequency of the memory controller from the first frequency to the second frequency, firstly the memory controller should be restarted. During the restart of the memory controller, the operating frequency of the memory controller is set to the second frequency, achieving the adjustment of the output frequency of the memory controller from the first frequency to the second frequency. Since the memory is maintained at the self refresh mode during the adjustment of the memory controller, restart of the memory controller would not cause the data information in the memory to be lost.

At step S150, a third command configured to instruct the memory to exchange the data information according to the second frequency of the memory controller is transmitted to the memory.

The third command is transmitted to the memory controller, instructing the memory controller to output a new control signal to the memory.

When the output frequency of the memory controller is adjusted from the first frequency to the second frequency, the new controller signal is output from the memory controller to the memory for causing the memory to exit the self refresh mode and operate according to the second frequency of the memory controller, in order to achieve the adjustment of the operating frequency of the memory.

It is noted that, recently, various electronic devices such as a computer have display device. In order to prevent the user from being interfered by the adjustment of the operating frequency of the memory, a buffer may be provided in the display means to support a repetitive scanning and displaying of static display data, so as to maintain the displaying of a static picture. In this manner, the user may be notified that the operating frequency of the memory is being adjusted.

By adjusting the frequency of the memory controller after the data information in the memory is saved, embodiments of the present invention are capable of achieving a dynamic adjustment of the frequency of the memory when the system is operating without the need of the user to turn off and then turn on the electronic to adjust the frequency of the memory.

Figure 2:
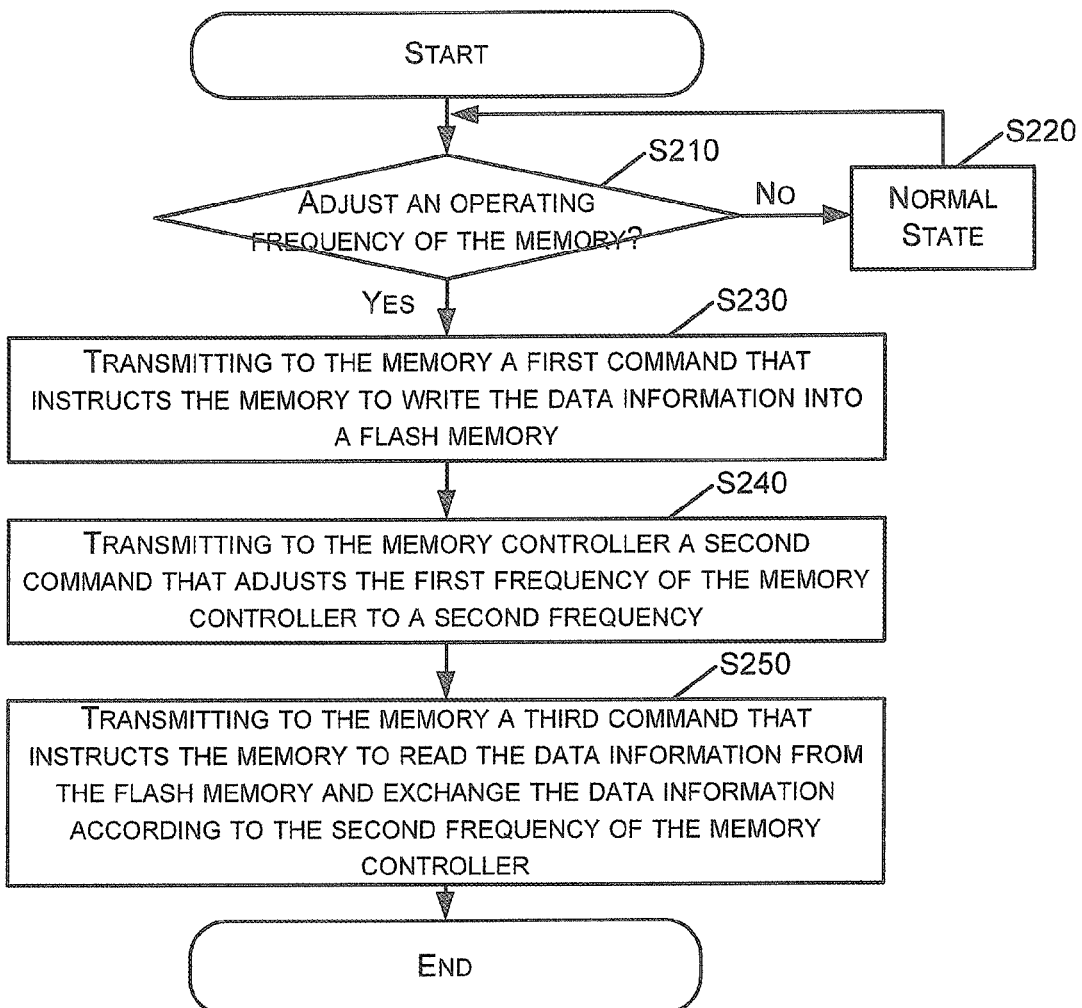
FIG. 2 is a flowchart schematically illustrating a method for adjusting the operating frequency of a memory according to another embodiment of the present invention.

With reference to FIG. 2, a flowchart schematically illustrating a method for adjusting the operating frequency of a memory according to another embodiment of the present invention is shown.

The method according to the embodiment of the present invention is applied in an electronic device including a memory controller and a memory connected with the memory controller, wherein the memory operates according to a first frequency of the memory controller when the electronic device is in an operating status. Conventionally, said first frequency is not changeable when the electronic device is in an operating status.

For the purpose of illustrating the embodiments of the present invention, a computer is taken as an example of the electronic device in the following. Those skilled will recognize that in addition to the computer, the present invention is applicable to other electronic devices such as a mobile phone, PDA (Personal Digital Assistant) and the like.

The method for adjusting the operating frequency of the memory includes the following steps.

At step 210, determining whether to adjust the operating frequency of the memory.

Determination of whether to adjust the operating frequency of the memory of the computer may be made according to the usage of system resource. The usage of system resource may include a usage of CPU (Central Processing Unit), a usage of memory, a usage of network bandwidth, etc. Any one of, or a combination of any two or three of, the usages of CPU, memory, and network bandwidth etc. may be taken as a measure of the usage of system resource. For example, a usage of system resource in the computer lower than a threshold (such as a usage of CPU lower than 10%, a usage of the memory lower than 20%, . . . ) indicates that there is a waste of the system resource. The operating frequency of the memory should be decreased when the usage of system resource in the computer is lower than a threshold, and increased when the usage of system resource in the computer is higher than a threshold. The present invention is not limited to determine whether to adjust the operating frequency of the memory of the computer according to the usage of system resource, and the determination may be made according to any other parameter such as a parameter set by the user.

If it is determined to adjust the operating frequency of the memory, the process proceeds to step S230, otherwise, the process proceeds to step S220.

At step S220, no setting is required to be applied to the computer, and the computer is operated normally (i.e. the memory exchanges the data information with the central processor at the first frequency), and the process proceeds to step S210.

At step S230, a first command configured to instruct the memory to write the data information into a flash memory.

In the embodiment shown by FIG. 2, the first command is configured to instruct the memory to enter a self refresh mode in order to keep the data information in the memory from being lost. In the present embodiment, the data information in the memory is kept from being lost by writing the data information in the memory into a flash memory.

At step S240, a second command configured to adjust the first frequency of the memory controller to a second frequency is transmitted to the memory controller.

In practice, in order to adjust the output frequency of the memory controller from the first frequency to the second frequency, firstly the memory controller should be restarted. During the restart of the memory controller, the operating frequency of the memory controller is set to the second frequency, achieving the adjustment of the output frequency of the memory controller from the first frequency to the second frequency.

At step S250, a third command configured to instruct the memory to read the data information from the flash memory and exchange the data information according to the second frequency of the memory controller is transmitted to the memory.

The reason why the data information should be read back by the memory from the flash memory is that the data information in the memory would be lost during adjusting the output frequency of the memory from the first frequency to the second frequency.

When the output frequency of the memory controller is adjusted from the first frequency to the second frequency, a new controller signal is output from the memory controller to the memory for causing the memory to operate according to the second frequency of the memory controller, in order to achieve the adjustment of the operating frequency of the memory.

It is noted that, recently, various electronic devices such as a computer have display means. In order to prevent the user from being interfered by the adjustment of the operating frequency of the memory, a buffer may be provided in the display means to support a repetitive scanning and displaying of static display data, so as to maintain the displaying of a static picture. In this manner, the user may be notified that the operating frequency of the memory is being adjusted.

A general description of the present invention will be provided in the following. When the operating frequency of the memory needs to be adjusted, for example, when the frequency of the central processor is changed (increased or decreased), when the usage of system resource is changed, or when an instruction for adjusting the operating frequency of the memory is issued by the user, an interrupt is generated to keep the state of the entire system unchanged. At this point, in order to prevent the user from being interfered by the adjustment of the operating frequency of the memory, a buffer may be provided in the display means to support a repetitive scanning and displaying of static display data, so as to maintain the displaying of a static picture. In this manner, the user may be notified that the operating frequency of the memory is being adjusted. Then a first command is generated and transmitted to the memory for causing the memory enter a self refresh mode or save the data into another buffer, ensuring that the data in the memory would not be lost during the adjustment of the operating frequency of the memory. Then a second command configured to adjust the first frequency of the memory controller to a second frequency is generated and transmitted to the memory controller. After the first frequency of the memory controller is adjusted to the second frequency, a third command configured to instruct the memory to exchange the data information according to the second frequency of the memory controller is transmitted to the memory, achieving the adjustment of the operating frequency of the memory.

By adjusting the frequency of the memory controller after the data information in the memory is saved, embodiments of the present invention are capable of achieving a dynamic adjustment of the frequency of the memory when the system is operating without the need of the user to turn off and then turn on the electronic to adjust the frequency of the memory.

Figure 3:
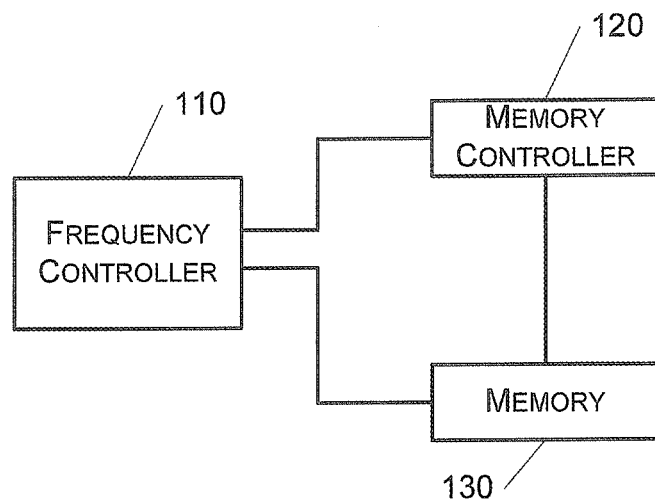
FIG. 3 is a diagram schematically showing structure of an electronic device according to an embodiment of the present invention.

With reference to FIG. 3, a diagram schematically showing structure of an electronic device according to an embodiment of the present invention is shown. The electronic device includes a memory controller 120 and a memory 130 connected with the memory controller 120, wherein the memory 130 runs according to a first frequency of the memory controller 120 when the electronic device is in an operating status. Conventionally, said first frequency is not changeable when the electronic device is in an operating status.

The electronic device further includes a frequency controller 110 connected to the memory controller 120 and the memory 130 respectively, for transmitting to the memory 130 a first command configured to instruct the memory 130 to keep the data information in the memory 130, transmitting to the memory controller 120 a second command configured to adjust the first frequency of the memory controller 120 to a second frequency, and transmitting to the memory 130 a third command configured to instruct the memory 130 to exchange the data information according to the second frequency of the memory controller 120.

In a particular instance, if the electronic device is a computer, some of the functions of the frequency controller 110 may be implemented by BIOS (Basic Input Output System). If the electronic device is a mobile phone or other electronic device, some of the functions of the frequency controller 110 may be implemented by a firmware FW.

In an embodiment of the electronic device of the present invention, the first command is configured to instruct the memory to enter a self refresh mode.

Particularly, the first command is configured to instruct the memory to enter a self refresh mode in order to keep the data information in the memory 130.

The memory 130 enters the self refresh mode by a self refresh command (REFS-EN). After the memory 130 enters the self refresh mode, the data information in the memory 130 may be kept from being lost.

The electronic device may further comprise a receiving unit (not shown) for receiving an instruction for adjusting the frequency of the memory, wherein the instruction for adjusting the frequency of the memory is generated when the operating frequency of the central processor is adjusted from the third frequency to a fourth frequency, or generated according to a usage of system resource.

In the present invention, the instruction for adjusting the frequency of the memory may be generated in various manners, such as generated according to an instruction from the user, according to a change of the operating frequency of the central processor, or according to a change of the usage of system resource. For example, an instruction for increasing the operating frequency of the central processor is generated when the operating frequency of the central processor is increased, and an instruction for decreasing the operating frequency of the central processor is generated when the operating frequency of the central processor is decreased; an instruction for increasing the frequency of the memory is generated when the usage of system resource is increased, and an instruction for decreasing the frequency of the memory is generated when the usage of system resource is decreased . . . .

The third command is configured to instruct the memory to exchange the data information according to the second frequency of the memory controller.

The third command is transmitted to the memory controller, instructing the memory controller to output a new control signal to the memory.

When the output frequency of the memory controller is adjusted from the first frequency to the second frequency, the new controller signal is output from the memory controller to the memory for causing the memory to exit the self refresh mode and run according to the second frequency of the memory controller, in order to achieve the adjustment of the operating frequency of the memory.

In another embodiment of the electronic device of the present invention, the first command is configured to instruct the memory to write the data information into a flash memory, thereby the data information is kept from being lost.

The second command is configured to adjust the first frequency of the memory controller to a second frequency.

The electronic device may further include a receiving unit (not shown) for receiving an instruction for adjusting the frequency of the memory, wherein the instruction for adjusting the frequency of the memory is generated when the operating frequency of the central processor is adjusted from the third frequency to a fourth frequency, or generated according to a usage of system resource.

The third command is configured to instruct the memory to read the data information back from the flash memory and exchange the data information according to the second frequency of the memory controller.

The reason why the data information should be read back by the memory from the flash memory is that the data information in the memory would be lost during adjusting the output frequency of the memory from the first frequency to the second frequency.

When the output frequency of the memory controller is adjusted from the first frequency to the second frequency, a new controller signal is output from the memory controller to the memory for causing the memory to exit the self refresh mode and run according to the second frequency of the memory controller, in order to achieve the adjustment of the operating frequency of the memory.

The operating process and operating principle of the respective components of the apparatus has been already described in detail in the foregoing embodiments of the method, and thus is not described again in the embodiments of apparatus for the purpose of clarity and simplicity.

Figure 4:
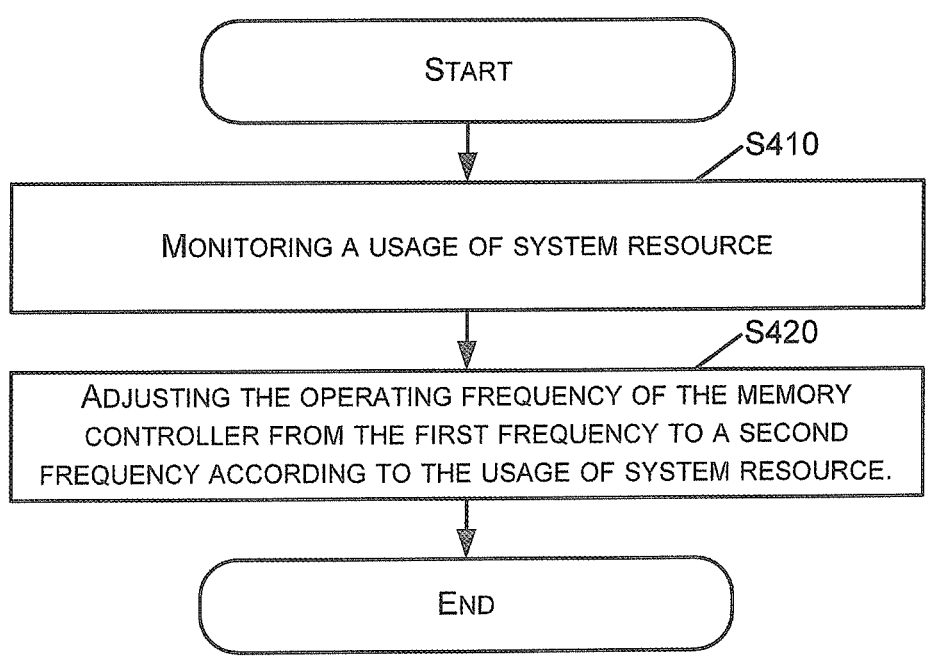
FIG. 4 is a flowchart schematically illustrating a method for adjusting the operating frequency of a memory according to yet another embodiment of the present invention.

Furthermore, as shown in FIG. 4, a method for adjusting the operating frequency of a memory is described from another aspect of view. The method is applied to an electronic device comprising a central processor having a third frequency, a memory controller having a first frequency, and a memory exchanging data information with the central processor according to the first frequency of the memory controller, characterized in that, said method includes following steps.

At step S410, a usage of system resource is monitored.

At step S420, the operating frequency of the memory controller is adjusted according to the usage of system resource, such that the operating frequency of the memory controller is adjusted from the first frequency to a second frequency.

Figure 5:
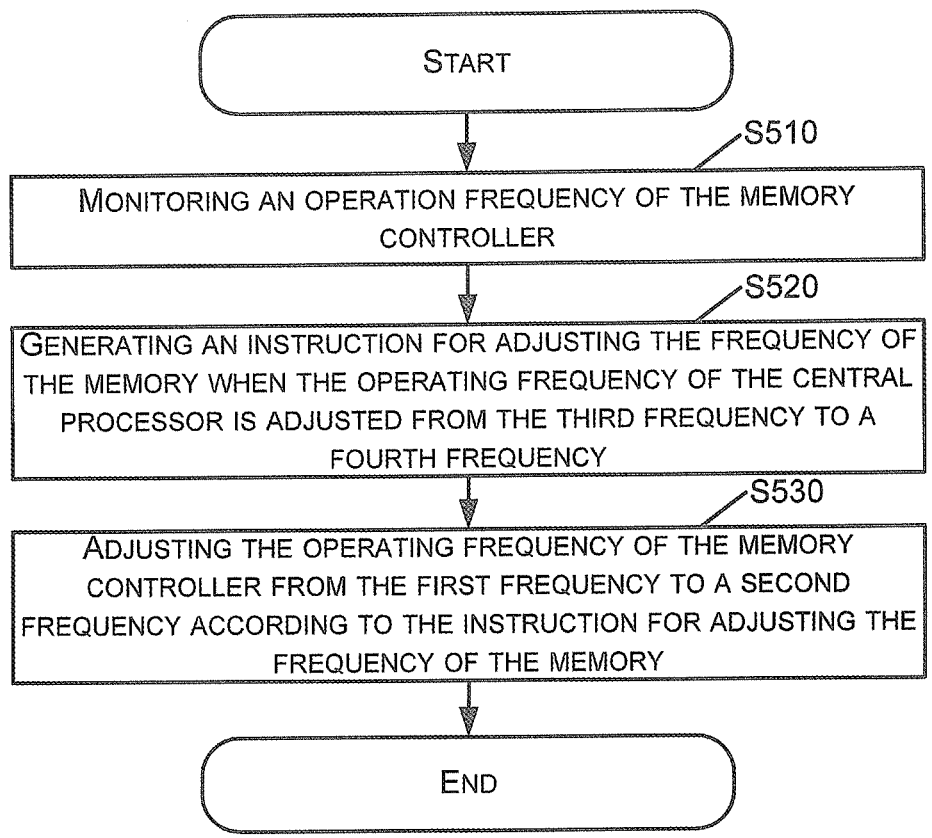
FIG. 5 is a flowchart schematically illustrating a method for adjusting the operating frequency of a memory according to yet another embodiment of the present invention.

Furthermore, as shown in FIG. 5, a method for adjusting the operating frequency of a memory is described from yet another aspect of view. The method is applied to an electronic device comprising a central processor having a third frequency, a memory controller having a first frequency, and a memory exchanging data information with the central processor according to the first frequency of the memory controller, characterized in that, said method includes following steps.

At step S510, the operation frequency of the central processor is monitored.

At step S520, an instruction for adjusting the frequency of the memory is generated when the operating frequency of the central processor is adjusted from the third frequency to a fourth frequency.

At step S530, the operating frequency of the memory controller is adjusted from the first frequency to a second frequency according to the instruction for adjusting the frequency of the memory.

How to implement the step S530 has already been described in detail in the foregoing embodiments with reference to FIGS. 1 and 2, and thus is not described again for the purpose of clarity and simplicity. Of course, the present invention is not limited to implement the step S530 as described in the embodiments with reference to FIGS. 1 and 2, the step S530 may be implemented in any other manner.

Those skilled in the art will recognize that some or all of the steps of the method according to the above described embodiments may be implemented by a program and a hardware controlled by the program. The program may be stored in a computer readable media such as diskette, compact disc, ROM (Read-Only Memory), or RAM (Random Access Memory). In the respective embodiments of the method according to the present invention, the order of the steps is not limited by the sequence number of these steps. Without any inventive effort, those skilled in the art will recognize that any change in the order of the steps falls within the scope of the present invention.

The preferred embodiments of the present invention have been described above and the present invention is not limited thereto. Any variation, alternation, or modification made to these embodiments without departing from the sprit and principle of the present invention should fall within the scope of the present invention.

What is claimed is:

1. A method for adjusting an operating frequency of a memory, wherein the method is applied to an electronic device comprising a central processor having a third frequency, a memory controller having a first frequency, and a memory connected with the memory controller, and the memory operates at the first frequency of the memory controller when the electronic device is in an operating mode and exchanges data information with the central processor according to the first frequency of the memory controller, said method comprises:

monitoring a usage of a system resource;

adjusting an operating frequency of the memory controller according to the usage of the system resource such that the operating frequency of the memory controller is adjusted from the first frequency to a second frequency;

wherein the adjusting the operating frequency of the memory controller comprises:

transmitting to the memory a first command that instructs the memory to hold the data information in the memory;

transmitting to the memory controller a second command that adjusts the first frequency of the memory controller to the second frequency; and transmitting to the memory a third command that instructs the memory to exchange the data information with the central processor according to the second frequency of the memory controller, wherein the usage of the system resource includes at least one of a usage of the central processor, a usage of the memory and a usage of network bandwidth, and wherein a repetitive scanning and displaying of static display data is supported while holding the data information in the memory, so as to notify a user that the operating frequency of the memory is being adjusted, and the method further comprises, before transmitting the first command to the memory;

receiving an instruction for adjusting the operating frequency of the memory, wherein the instruction for adjusting the operating frequency of the memory is generated when the operating frequency of the central processor is adjusted form the third frequency to the fourth frequency, or generated according to the usage of the system resource.

2. The method of claim 1, wherein the first command further instructs the memory to enter a self refresh mode in order to hold the data information in the memory.

3. The method of claim 1, wherein the first command further instructs the memory to write the data information into a flash memory; and wherein the third command further instructs the memory to read the data information from the flash memory and exchange the data information according to the second frequency of the memory controller.

4. An electronic device, comprising:
a memory controller having a first frequency;
a central processor having a third frequency;
a memory connected to the memory controller, wherein the memory operates according to the first frequency of the memory controller when the electronic device is in an operating status and exchanges data information with the central processor according to the first frequency of the memory controller;
a frequency controller connected to the memory controller and the memory respectively, and adapted to monitor a usage of a system resource, adjust an operating frequency of the memory controller according to the usage of the system resource such that the operating frequency of the memory controller is adjusted from the first frequency to a second frequency by transmitting to the memory a first command that instructs the memory to hold the data information in the memory, transmitting to the memory controller a second command that adjusts the first frequency of the memory controller to a second frequency, transmit to the memory a third command that instructs the memory to exchange the data information according to the second frequency of the memory controller;
a receiving unit adapted to receive an instruction for adjusting the operating frequency of the memory, wherein the instruction for adjusting the frequency of the memory is generated when the operating frequency of the central processor is adjusted from the third frequency to a fourth frequency, or generated according to the usage of the system resource; and
a buffer provided in a display of the electronic device, configured to support a repetitive scanning and displaying of static display data while holding the data information in the memory, so as to notify a user that the operating frequency of the memory is being adjusted,
wherein the usage of the system resource includes at least one of a usage of the central processor, a usage of the memory, and a usage of network bandwidth.

5. The electronic device of claim 4, wherein the first command further instructs the memory to enter a self refresh mode in order to hold the data information in the memory.

6. The electronic device of claim 4, wherein the first command further instructs the memory to write the data information into a flash memory; and wherein the third command further instructs the memory to read the data information from the flash memory and exchange the data information according to the second frequency of the memory controller.

7. A method for adjusting an operating frequency of a memory, wherein the method is applied to an electronic device comprising a central processor having a third frequency, a memory controller having a first frequency, and a memory exchanging data information with the central processor according to the first frequency of the memory controller, said method comprises:
monitoring an operating frequency of the central processor;
generating an instruction for adjusting the frequency of the memory when the operating frequency of the central processor is adjusted from the third frequency to a fourth frequency; and
adjusting the operating frequency of the memory controller from the first frequency to a second frequency according to the instruction for adjusting the frequency of the memory by transmitting to the memory a first command that instructs the memory to hold the data information in the memory;
transmitting to the memory controller a second command that adjusts the first frequency of the memory controller to a second frequency; and
transmitting to the memory a third command that instructs the memory to exchange the data information according to the second frequency of the memory controller,
wherein a repetitive scanning and displaying of static display data is supported while holding the information in the memory, so as to notify a user that the operating frequency of the memory is being adjusted, and
the method further comprises, before transmitting the first command to the memory;
receiving an instruction for adjusting the operating frequency of the memory, wherein the instruction for adjusting the operating frequency of the memory is generated when the operating frequency of the central processor is adjusted from the third frequency to a fourth frequency, or generated according to a usage of a system resource.

\* \* \* \* \*